Dec. 18, 1962 P. B. SHUTT 3,068,651
FACE SEAL IN MASTER CYLINDER

Filed July 25, 1960 2 Sheets-Sheet 1

INVENTOR.
PAUL B. SHUTT
BY
William P. Hickey
ATTORNEY

United States Patent Office 3,068,651
Patented Dec. 18, 1962

3,068,651
FACE SEAL IN MASTER CYLINDER
Paul B. Shutt, St. Joseph, Mich., assignor to The Bendix Corporation, St. Joseph, Mich., a corporation of Delaware
Filed July 25, 1960, Ser. No. 44,976
1 Claim. (Cl. 60—54.6)

The present invention relates to master cylinders; and more particularly to new and improved compensating means for these master cylinders.

Master cylinders of the type used to actuate the hydraulic systems of automotive vehicles generally involve a type of hydraulic pumping device which forces hydraulic fluid under pressure to the brake actuating motors when its fluid displacement member is actuated; and which induces the return of this hydraulic fluid to the master cylinder when its fluid displacement member is retracted. It is absolutely necessary in such a device that some type of fluid compensating means be provided which will communicate a low pressure reservoir of hydraulic fluid to the driven system when the fluid displacement member is in its retracted position so as to make up for changes in volume of the driven system, and keep it full of hydraulic fluid at all times. Inasmuch as hundreds of millions of these devices have been built, the art is highly competitive; and any improvement which is provided must be simple, rugged, efficient in its operation, and inexpensive to manufacture.

Accordingly an object of the present invention is the provision of a new and improved master cylinder having compensating means therefore which can be opened and closed with a minimum of movement of its fluid displacement member.

A further object of the present invention is that the compensating means which is provided be simple, involving a minimum of sliding seals that are subject to failure is compact, and is inexpensive to manufacture.

Figure 1:
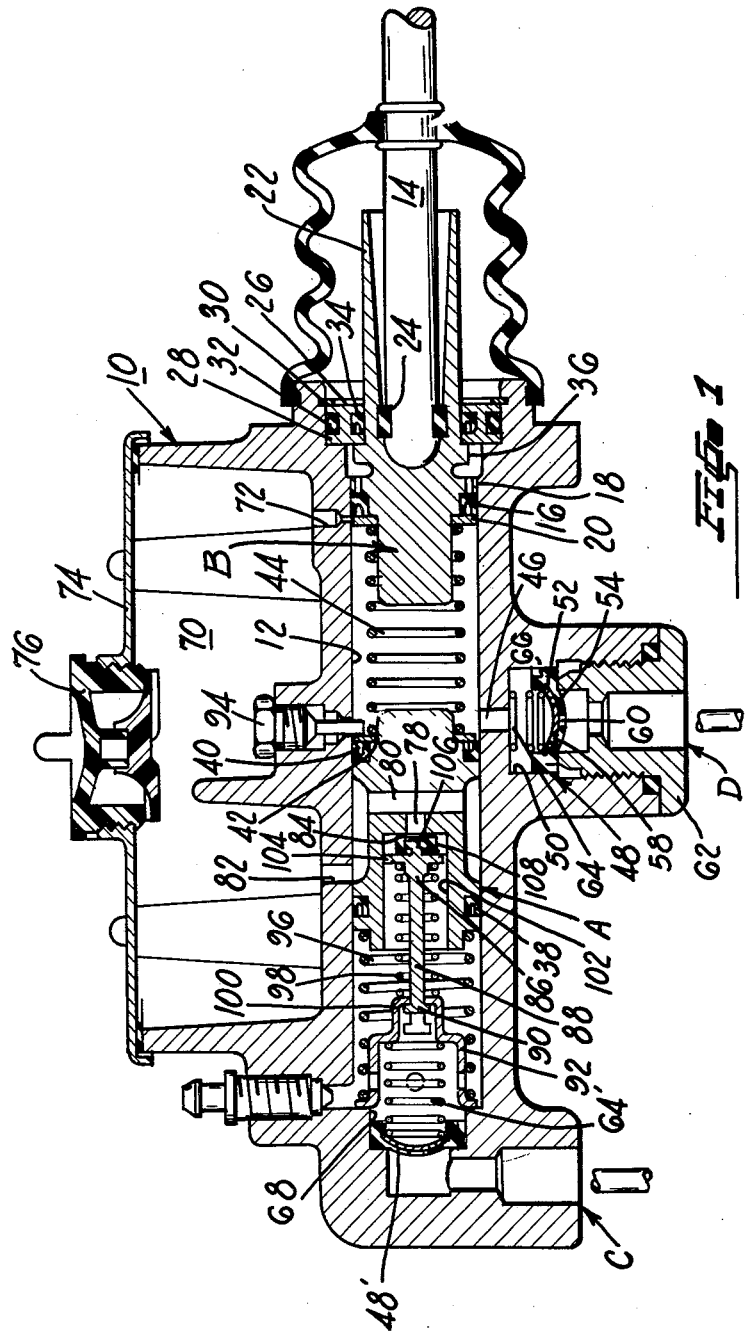
Figure 2:
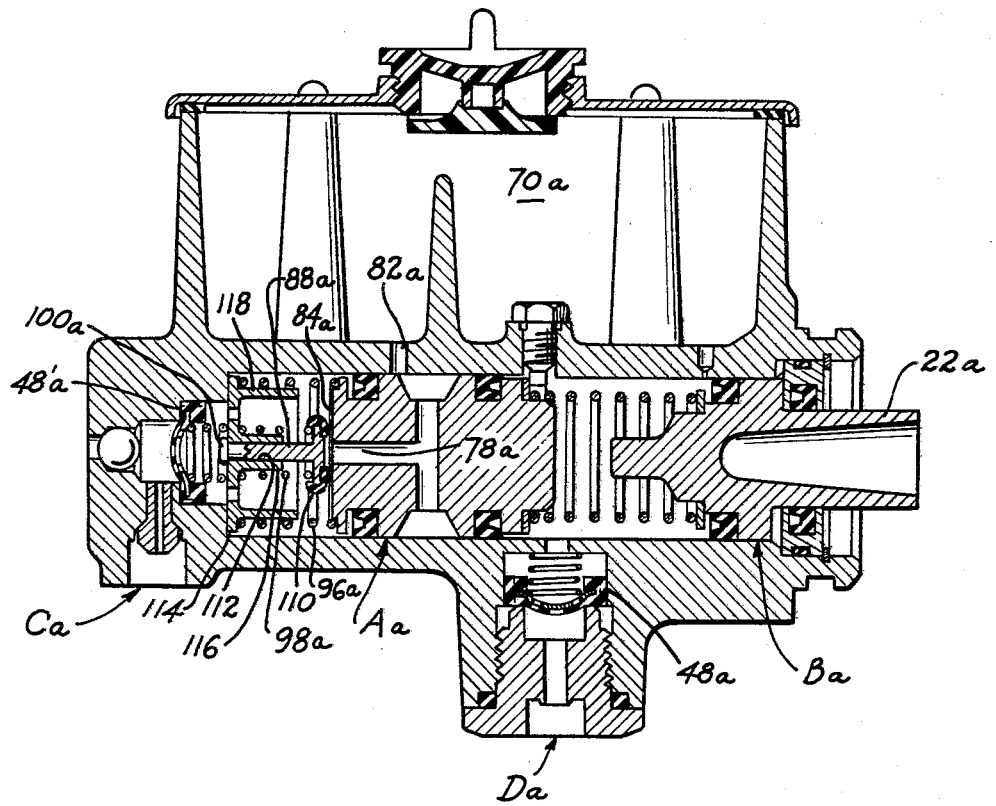

The invention resides in certain instructions and combinations and arrangement of parts; and further objects and advantages of the invention will become apparent to those skilled in the art to which the invention relates from the following description which refers to the accompanying drawings forming a part of this specification, and in which:

FIGURE 1 is a cross sectional view of a master cylinder showing a preferred embodiment of applicant's invention; and FIGURE 2 is a cross sectional view of a master cylinder showing a second embodiment of the present invention.

The master cylinder shown in FIGURE 1 is generally what is known as a tandem piston unit having fluid displacement members A and B therein for forcing fluid to outlets C and D which are respectively communicated to the front and rear wheel brakes of an automotive vehicle. The master cylinder shown generally comprises a housing 10 having a longitudinally extending bore 12 therein in which the unit's fluid displacement members or pistons A and B are located. The outer piston B is adapted to be forced into the bore 12 by means of a push rod 14 that is connected to the usual foot pedal lever of the automotive vehicle (not shown); and the pressure that is generated by the outer fluid displacement member B is normally exerted against and used to force the inner fluid displacement member A down its portion of the bore 12 to force fluid out of its outlet C. Inasmuch as the opposite ends of the inner fluid displacement member A are of the same diameter the pressure in the outlet C will at all times approximately equal the pressure in the outlet D so that the braking effort between the separated front and rear portions of the braking system will at all times be substantially equal.

The outer fluid displacement member B has a cup shaped seal 16 that engages the sidewalls of the chamber 12 and is confined between a guide flange 18 and a seal retaining washer 20. The piston B also includes a rearwardly extending tubular portion which extends outwardly of the bore 12, into the central opening of which tubular portion, the push rod 14 is fixed by means of a plastic ring 24 which seats in opposing recesses that are positioned in the outer surface of the push rod 14, and the inner surface of the tubular portion 22, respectively. The bore 12 is closed off by means of a seal retaining ring 26 held against shoulder 28 by means of snap ring 30. O-ring 32 is retained in the outer periphery of the ring 26 to provide a seal with respect to the side walls of the bore 12, and cup seal 34 is retained in the inner portion of the ring 26 for sliding sealing engagement with the outer tubular portion 22 of the piston B. The outer piston B is also provided with a flange 36 which abuts the seal ring 26 and limits its outward movement.

The inner piston A is a generally spool shaped structure having oppositely facing spaced apart cup seals 38 and 40 adjacent its opposite ends. The inner cup seal 38 is retained in a suitable recess in the periphery of the piston A, and the outer cup seal 40 is retained on the end of the piston A by means of a retaining washer 42 that is held in position by a coil spring 44 that is positioned between the retaining washer 42 and the seal retaining washer 20 of the outer piston B.

The volume of fluid confined in the portion of the chamber 12 between the inner and outer pistons A and B is forced to the system connected to the outlet D through passageway 46 and a conventional residual pressure check valve structure indicated generally at 48. The residual pressure check valve structure 48 is positioned in a counterbore 50 in the passageway 46; and generally comprises a metallic disk shaped washer 52 and a rubber diaphragm 54 that is stretched over the outer surface of the washer 52 and is held in place by thickened peripheral portions 56 which are snapped over the periphery of the washer 52. The washer 52 has a plurality of openings 58 that are positioned off center and normally covered by the diaphragm 54; and the diaphragm 54 has a centrally located opening 60 that is normally closed off by the plate 54. Flow out through the residual pressure check valve structure 48 passes through openings 58 to lift the diaphragm 54 out of engagement with the outer surface of the disk 52, and thereafter flows through the central opening 60 of the diaphragm 54. The check valve structure 48 is normally biased up against the end of the outlet fitting 62 by means of a coil spring 64; and the outer periphery of the diaphragm 54 has suitable grooves 66 therein so that return flow through the outlet lifts the check valve structure 48 out of engagement with the outlet fitting 62, and thence flows through the grooves 66 to the bore 12 of the master cylinder. An identical residual pressure check valve structure 48' is positioned in an inner stepped portion 68 of the chamber 12 which leads to the outlet connection C. The residual pressure check valve structure 48' is constructed and operates in an identical manner to that for the structure 48, and so need not further be described.

As previously indicated it is necessary in master cylinders that a reservoir of low pressure fluid be communicated to the master cylinder fluid pressurising chamber 12 after each application so that the driven system can be maintained full of hydraulic fluid. In the embodiment shown in FIGURE 1, the portion of the bore 12 which communicates with the outlet D is communicated to a reservoir 70 when the piston B is in its retracted position by means of the conventional fluid compensating port 72. The compensating port 72 is positioned just forwardly of the retracted position of the cup seal 16 of the piston B shown in the drawing, so that open communication is established in this position of the piston. Forward movement of the piston B causes the lip of the seal 16 to slide over the opening of the compensating port 72, and close off communication between the reservoir 70 and the bore 12, thereafter pressurizes the fluid in the bore 12. The upper end of the reservoir 70 is of course closed off by means of a cover plate 74 to retain liquid in the reservoir; and a plastic filler cap, made in two sections that are snapped together, is threaded into the cover plate 74 to permit the easy filling of the reservoir 70.

According to principles of the present invention the portion of the bore 12 forwardly of the inner fluid displacement member A is provided with compensating means which can be closed off with considerable less movement of the fluid displacement member A then can the conventional compensating port 72 previously described. It will be seen that the conventional compensating port 72 has to be of fairly large diameter, and requiring in the neighborhood of sixty thousandths of an inch stroke to move the lip of its seal over the compensating port and begin pressurizing the hydraulic fluid.

The compensating structure for the portion of the bore 12 forwardly of the piston A generally comprises an axially extending compensation port 78 carried by the movable wall A, and which is communicated to the portion of the bore 12 between the seals 38 and 40 by means of a transverse passage 80 in the piston A. The reservoir 70 is continually communicated to the portion of the side walls of the bore 12 by a passage 82 that is so positioned as to always be between the seals throughout the full stroke of the piston A. The piston A is provided with a valve seat which surrounds the compensating port 78 and faces the inner end of the bore 12, and a suitable poppet member 86 is positioned just forwardly of the valve seat 84 so as to be capable of abutment with the valve seat. The poppet member 86 is provided with an integral axially extending rod portion 88 which extends towards the inner end of the bore 12, and which is supported and guided in the central opening 90 of a stamped guide 92 that is positioned against the inner end of the bore 12. Outward movement of the piston A is limited by a suitable stop 94 in the side walls of the bore 12; and the guide 92 is held in position against the bottom of the bore 12 by means of a piston return spring 96 that is positioned between the guide 92 and the piston A.

The guide 92 is a generally cup shaped member having sufficient axial length to accommodate forward movement of the rod portion 88 into the guide; and the poppet member 86 is biased outwardly or away from of the guide 92 by means of a coil spring 98. The rod portion 88 is prevented from complete withdrawal of the guide by means of a flange 100 which abuts the inner surface of the guide 92 and which holds the poppet member 86 a predetermined distance away from the seat 84 when the piston A is in engagement with its stop 94. In the preferred embodiment shown in the drawing, the valve seat 84 is positioned in the bottom of a forwardly facing chamber 102 in the piston A, and the poppet member 86 is guided from the sidewalls of this bore 102 by means of fingers on its periphery that are formed by means of suitable slots that permit passage of fluid. The preferred construction of poppet shown in the drawing includes a center metallic portion 106 which abuts the valve seat 84 to transmit the bulk of the pressure force which is exerted on the poppet 86 during actuation of the master cylinder, and further includes a surrounding rubber seal 108 which projects a slight distance rearwardly of the end face of the metallic portion 106 for sealing abutment with the valve seat 84. The sealing surface of the rubber seal 108 is suitably rounded so that deformation of the rubber seal 108 during engagement with the seat 84 will not cause the material of the seal to flow inwardly past the center portion 106 and thereby be pinched off as the portion 106 moves into engagement with the seat 84.

The master cylinder shown in FIGURE 1 is brought into operation by inward movement of the push rod 14 which causes the outer fluid displacement member B to in turn move its seal 16 forwardly over the compensating port 72 thereby closing off communication with the reservoir 70. Thereafter the fluid which is trapped between the fluid displacement members A and B becomes pressurized to the extent that resistance is provided by the system that is connected to the outlet connection D. This pressure is of course exerted against the outer end of the fluid displacement A causing it to be moved forwardly against the force of the return spring 96 to thereby bring the poppet member 86 into engagement with the valve seat 84. It is a property of the type of poppet valve construction shown that a large flow area be provided with but a short distance between the poppet member and valve seat; and so in the embodiment shown in the drawing, a clearance of only approximately twenty thousandths of an inch is normally maintained between the poppet 86 and the valve seat 84. It will be seen therefore that only approximately ⅓ as much travel is required of the piston A to close off its compensating port as was required of the outer fluid displacement member B to close off its compensating port 72.

After initial contact of the rubber seal 108 with the valve seat 84 is established, pressure begins to build up in the inner end of the chamber 12 as required by the back pressure of the system which is connected to the outlet port C. As pressure begins to build up, the end of the seal 108 is deformed to flatten out against the valve seat 84. During this flattening process, some of the material of course flows radially inwardly; and as previously indicated, the end of the seal is so rounded that this inward movement of the material takes place radially outwardly of the metal portion 106 and does not interfere with its movement into engagement with the valve seat 84. Following the initial contact of the seal 108 with the seat 84, the poppet member 86 moves along with the piston A causing deformation of the coil spring 98, and causing the end of the rod portion 88 to move into the cup shaped guide 92. During forward travel of the piston A fluid is displaced through the residual pressure check valve 48' in the same manner as previously described for the residual pressure check valve structure 48.

As previously indicated the pressures in the outlet connections C and D are substantially equal at all times; and when sufficient braking effort has been achieved, the operator ceases further forward movement of the push rod 14. It will be understood of course that as increasing pressure is developed in the outlets C and D, the piston B moves down the bore 12 at a faster rate than as the inner piston A; inasmuch as the fluid that is displaced by the piston A both actuates the piston A and displaces fluid out through the outlet connection D.

When it is desired to reduce the braking effort in the systems connected to the outlets C and D, the push rod 14 is permitted to retract permitting fluid to reenter the outlet connection C and D and pass through the residual pressure check valve structures 48' and 48 in the manner previously described. When the desired braking effort in both systems is achieved, the push rod 14 of course is held stationary; and if a complete release of the braking systems is desired, force on the push rod 14 is released, whereupon piston return spring 96 forces the piston A into engagement with the stop 94 and the coil spring 44 forces the piston B into engagement with the seal retaining ring 26. As previously indicated, the flange 100 on the rod 88 is so positioned as to cause the rubber seal 108 to move out of engagement with the seat 84 by approximately twenty thousandths of an inch when the piston A engages the stop 94 so that any loss of fluid, or changes in volume in, the system connected to port C can be compensated for by the flow of fluid from the reservoir 70 through passages 80 and 78 to the end of the bore 12. Likewise any loss of fluid from, or change of volume in, the system connecting to the outlet port D is compensated for by flow of fluid to the outer end of the bore 12 through the compensating port 72 when the piston B is in abutment with its return stop or seal retaining ring 26. It will further be seen that if a complete failure of the system connected to the outlet port D occurs, the inner end of the piston B can move into abutment with the outer surface of the piston A and so actuate the still functioning system that is connected to the outlet connection C.

The embodiment shown in FIGURE 2 of the drawing is constructed substantially identically with, and operates in the same manner as, the embodiment shown if FIGURE 1—expecting that a slightly different compensating valve structure is provided for its inner piston. Those portions of the embodiment shown in FIGURE 2 which are substantially identical with corresponding portions of the embodiment shown in FIGURE 1 will be designated by a like reference numeral characterized further in that a suffix $a$ is affixed thereto.

This piston Aa of FIGURE 2 differs principally from that shown in FIGURE 1 in that the compensating valve seat 84a is positioned on the end surface of the piston Aa rather than on the inner end of an internal bore such as 102 of the previous embodiment. Its poppet member 110 although shaped slightly differently than the poppet member 86, functions generally in the same manner and differ principally therefrom in the manner in which it is guided relative to the valve seat 84a. In the embodiment shown in FIGURE 2 the rod portion 88a of the poppet member 110 is received in a central opening 112 of a machined guide 114 in such manner that the poppet member 110 is supported and guided solely by the side walls of the opening 112. The opening 112 is formed in an axially extending boss 116 so as to give greater axial length to the guide; and a larger diameter axially extending boss 118 is provided to limit inward movement of the piston Aa and at the same time center the piston return spring 96a. The rod portion 88a of the poppet member 110 is also provided with a flange 100a which engages the end surface of the guide 114 to limit outward movement of the poppet member 110.

It will be apparent that the objects heretofore enumerated as well as others have been achieved; and that there has been provided a new and improved type of compensating means which is extremely rugged, does not involve sliding seals, and which requires a minimum of piston movement in order to close off its compensating port.

While the invention has been described in considerable detail, I do not wish to be limited to the particular embodiments shown and described; and it is my intention to cover hereby all novel adaptations and modifications and arrangements thereof which come within the practice of those skilled in the art to which the invention relates.

I claim:

In a master cylinder and the like; a housing, having a fluid pressurizing chamber and a reservoir therein; a moveable wall in said fluid pressurizing chamber having a generally axially extending compensating port communicating with said reservoir; said wall forcing fluid out of said chamber when moved toward one end thereof; an annular shoulder at said one end of said chamber; a valve seat surrounding said compensating port and facing said one end of said chamber; a poppet member for sealing abutment with said valve seat; said poppet member being attached to one end of a generally axially extending circular rod; said rod having an abutment surface on the other end thereof; a guide member comprising a flat circular bottom surface having a face engaging an annular shoulder of said chamber and having port holes therein, a first large diameter annular wall spaced from the outer periphery of said bottom surface and extending axially from one face thereof, a second small diameter annular wall located within the first annular wall and extending a lesser axial distance away from said one face than said first annular wall, said second annular wall forming a tubular opening, the diameter of said tubular opening being substantially the same as the outer diameter of said rod; said guide member being located at said one end of said chamber with the outer periphery of said bottom surface contiguous the wall of said chamber and with the annular walls extending towards said valve seat of said movable wall; the other face of said bottom surface being in engagement with said shoulder; said rod being slidably mounted within said tubular opening with said abutment engaging said shoulder engaging face of said bottom surface; said rod and poppet member together having a greater axial length than said first annular wall; first spring means biasing said guide member and movable wall apart; said spring means being partially located between the wall of said chamber and said first annular wall and engaging the outer periphery of said first annular wall and the outer periphery of said one face; a second spring means for engaging said rod abutment with its respective face of said bottom surface; stop means for fixing the retracted position of said movable wall; said valve seat being uncovered when said movable wall is at retracted position; said first annular wall serving to limit the extent of movement of said movable wall during brake operation; a discharge opening at said one end of said chamber, and check valve means located between said guide bottom surface and said discharge opening.

References Cited in the file of this patent

UNITED STATES PATENTS

| | | |
|---|---|---|
| 2,174,615 | Bowen et al. | Oct. 3, 1939 |
| 2,347,239 | Berno | Apr. 25, 1944 |
| 2,649,692 | Stelzer | Aug. 25, 1953 |

FOREIGN PATENTS

| | | |
|---|---|---|
| 590,897 | Great Britain | July 31, 1947 |